United States Patent
Vanden Bussche et al.

(10) Patent No.: US 7,458,231 B1
(45) Date of Patent: Dec. 2, 2008

(54) SIMULTANEOUS REGASIFICATION OF LIQUEFIED NATURAL GAS AND DESALINATION

(75) Inventors: Kurt M. Vanden Bussche, Des Plaines, IL (US); Blaise J. Arena, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 357 days.

(21) Appl. No.: 11/207,950

(22) Filed: Aug. 19, 2005

(51) Int. Cl.
*C02F 1/22* (2006.01)
*B01D 9/04* (2006.01)
*F17C 9/02* (2006.01)

(52) U.S. Cl. .............. 62/532; 62/542; 62/544; 62/50.2

(58) Field of Classification Search .......... 62/532, 62/542, 544, 50.2, 620
See application file for complete search history.

(56) References Cited

U.S. PATENT DOCUMENTS

| | | | | |
|---|---|---|---|---|
| 3,535,210 A | * | 10/1970 | Linde et al. | 203/11 |
| 3,630,042 A | * | 12/1971 | Petsinger | 62/532 |
| 3,675,436 A | | 7/1972 | Ganiaris | 62/58 |
| 3,714,791 A | * | 2/1973 | Peck | 62/537 |
| 3,724,229 A | * | 4/1973 | Seliber | 62/50.3 |
| 3,892,103 A | | 7/1975 | Antonelli | 62/58 |
| T939,007 I4 | | 10/1975 | Seliber | 62/534 |
| 4,810,274 A | * | 3/1989 | Cheng et al. | 62/637 |
| 5,575,160 A | * | 11/1996 | Keus | 62/544 |
| 6,564,579 B1 | * | 5/2003 | McCartney | 62/620 |

\* cited by examiner

*Primary Examiner*—William C Doerrler
(74) *Attorney, Agent, or Firm*—Arthur E Gooding

(57) ABSTRACT

A process and apparatus is presented for the desalination of water by freezing seawater. The process is integrated into a liquefied natural gas regasification system.

11 Claims, 2 Drawing Sheets

SIMULTANEOUS REGASIFICATION OF LIQUEFIED NATURAL GAS AND DESALINATION

FIELD OF THE INVENTION

The present invention relates to a process for the desalination of seawater.

BACKGROUND OF THE INVENTION

The production of fresh water from sea water is produced from an evaporation of the water from the salt water and then condensing the purified water vapor. Another commercial method is the use of reverse osmosis. Fresh water also, can be produced by using a freezing process that separates the water as it freezes from the salt water.

Desalination of water by freezing has been studied, but not commercialized. One such desalination process using the cold temperatures of liquefied natural gas (LNG) is shown in U.S. Pat. No. 3,675,436, issued on Jul. 11, 1972. This process uses LNG to cool butane to a liquid and sprays the liquid butane into a crystallizer with seawater to form a butane-ice-brine mixture. The drawback of this process is the use of an intermediate heat exchange material, and the direct mixing of the butane with the seawater to form the butane-ice-brine mixture. This requires further processing to remove and recover the butane from the desalinated water and from the brine.

Even when there is no direct contacting of a cold hydrocarbon stream with seawater, the use of LNG for freezing seawater involves the liquefaction of a higher hydrocarbon stream for subsequent use in freezing seawater, as shown in U.S. Pat. No. 3,892,103, issued on Jul. 1, 1975. The use of an intermediate heat transfer medium requires more equipment, and entails greater losses, or lower efficiency in the process of freeze desalination.

A more common method of freeze desalination involves the use of vacuum freezing of water by spraying cooled seawater into an evacuated chamber creating small ice crystals that are subsequently separated from the brine and then melted. An example of this process is shown in U.S. Pat. No. 3,724,229, issued on Apr. 3, 1973. This process has the significant drawback of working with systems under vacuum.

Improvements in the process of freeze desalination can improve access to fresh water, while saving costs.

SUMMARY OF THE INVENTION

The invention is a process for desalination of water using the freezing capabilities of liquefied natural gas during the regasification process. In one embodiment, the liquefied natural gas is passed through one side of a heat exchanger with seawater passed through the other side of the heat exchanger. An ice-brine mixture is formed on the seawater side, while the natural gas is vaporized on the natural gas side of the exchanger. The ice-brine mixture is withdrawn from the heat exchanger and ice is separated from the mixture. The ice is subsequently melted and recovered as fresh water.

Additional objects, embodiments and details of this invention can be obtained from the following detailed description of the invention.

DETAILED DESCRIPTION OF THE INVENTION

Figure 1:
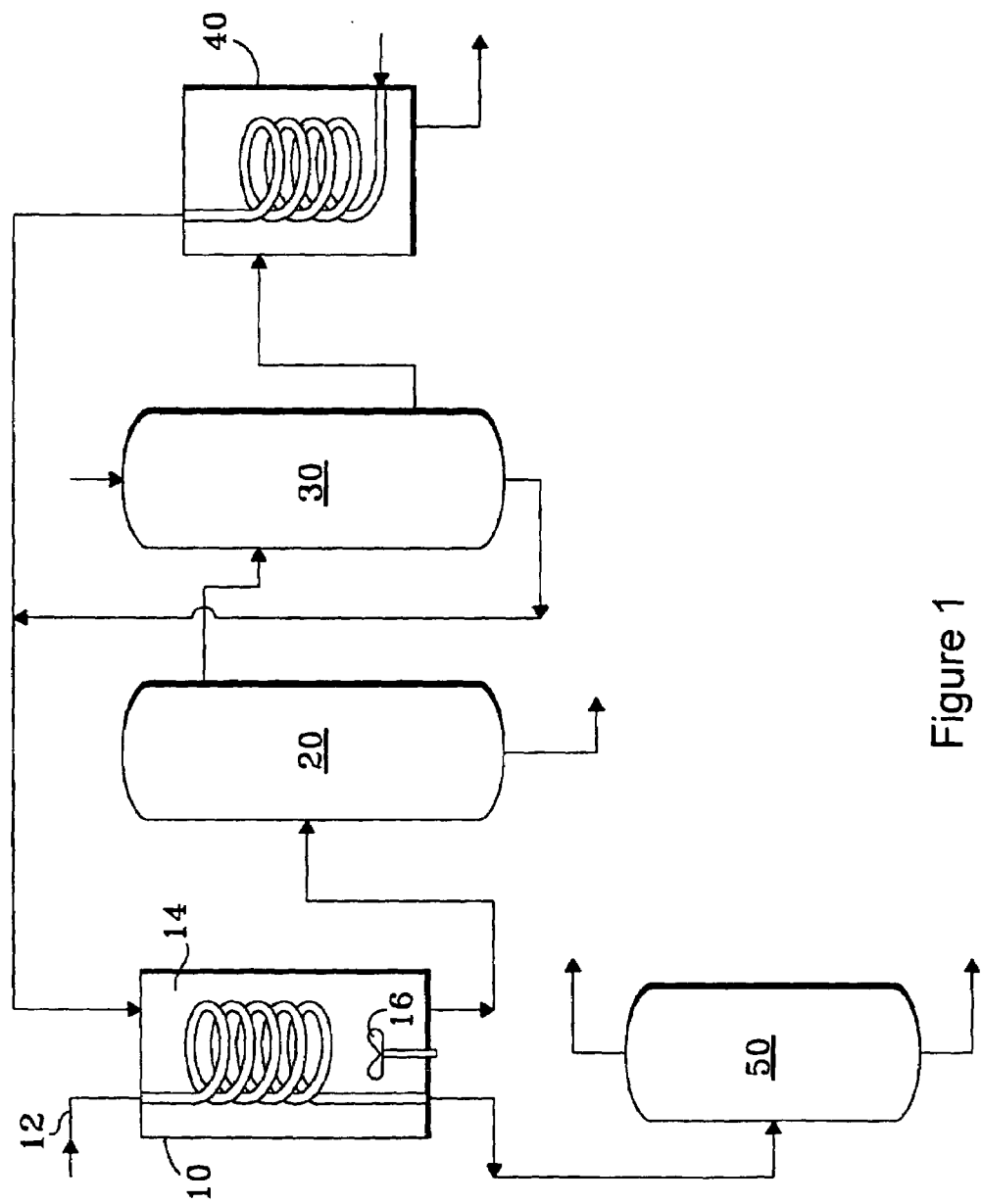
FIG. 1 is a first embodiment of the invention.

Liquefied natural gas is transported around the world as a means to move natural gas from regions where natural gas exists to regions where the natural gas is needed. After shipment, the LNG is regasified. The 'cold' in the LNG can be used to provide fresh water through the process of freeze desalination The present invention provides a process and apparatus for taking advantage of the energy transfer in the process of regasifying LNG. In one embodiment, as shown in FIG. 1, the process for desalinating water with the regasification of LNG includes passing the LNG and seawater through a heat exchanger 10. The LNG is passed through one side 12 and the seawater is passed through the other side 14 of the heat exchanger 10 keeping the LNG and seawater separate while gasifying the LNG and freezing the seawater. As the seawater freezes the salt in the sea water is rejected and an ice-brine mixture is formed. In one embodiment, an agitator 16 is included in the seawater side of the heat exchanger 10 to keep the ice-brine mixture as a mixture of small ice particles in the brine and to inhibit the formation of a large ice block. The ice-brine mixture is passed to a separator 20, where the ice is separated from the ice-brine mixture. The separator 20 comprises a tank that allows the ice-brine mixture to settle with the ice rising to the top and the brine sinking to the bottom of the tank. In the context of this invention, any water having dissolved salts can be used, and the invention is not restricted to seawater.

The ice is withdrawn from the separator 20 and passed to a wash unit 30, where the ice is rinsed with fresh water to remove residual salt on the surface of the ice. The ice is subsequently passed to a second heat exchange unit 40, or melting unit, wherein the ice is melted. The rinse water from the wash unit 30 can be passed to first heat exchanger 10 through mixing with the seawater that is directed to the first heat exchanger 10. The second heat exchanger 40 uses a saltwater stream flowing through the hot side to melt the ice, and providing fresh water to be drawn off.

In an alternative, the first embodiment includes a natural gas liquids separation unit 50. The regasified natural gas is passed from the first heat exchanger 10 to the separation unit 50. The separation unit 50 is for removing ethane, propane, and other hydrocarbons from the natural gas to meet the specifications of natural gas to be fed into natural gas pipelines. In one embodiment, the separation unit 50 comprises a fractionation column, wherein the regasified natural gas is fed to the fractionation column. A portion of the liquefied natural gas is supplied to provide the necessary cooling for vapor passing through the overhead condenser. Seawater is supplied to the boiler to provide the necessary heat to vaporize a portion of the condensed liquids at the bottom of the column.

In one embodiment, the process comprises pressurizing the liquefied natural gas to a pressure sufficient for injecting the regasified natural gas into a natural gas pipeline. Considerations for pressurization include optimization for the heat exchanger 10, and the natural gas separation unit 50. Pressurization is preferably to a pressure greater than 3 MPa (435 psia), and more preferably to a pressure greater than 6.5 Mpa (940 psia). Pressurization can be obtained during the pumping of the LNG through a feed pump 60 to the heat exchanger 10.

This apparatus and process involves no mixing of the natural gas with the water, nor does it require an intermediate hydrocarbon stream. Without the mixing of a hydrocarbon stream with the seawater, there is no need to have a separator to remove hydrocarbons from the fresh water, or from the brine, thereby saving equipment and operation costs. In addition, by keeping the natural gas separate from the seawater, water is not added to the natural gas and does not need to be later removed.

Figure 2:
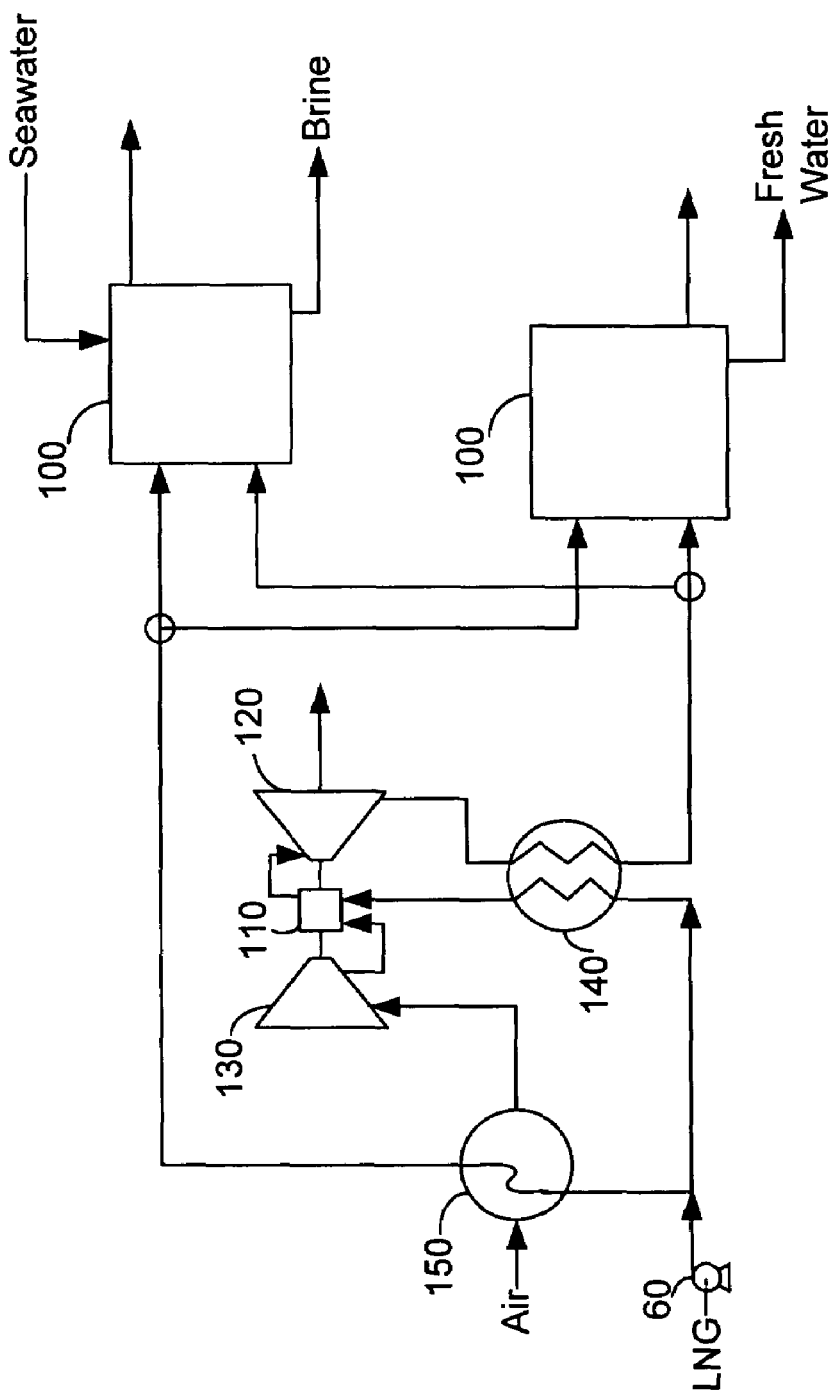
FIG. 2 is an alternate embodiment of the invention.

In a second embodiment, the process and apparatus provide for freezing of seawater to produce ice from liquefied natural gas in a periodic process. The process comprises alternating the flowing LNG and seawater through a heat exchanger to form ice, and then draining residual seawater and flowing a warm fluid through the heat exchanger to melt the ice and produce the fresh water. The process of the second embodiment is shown in FIG. 2. The process includes flowing a portion of LNG through the first side of a heat exchanger 100, and flowing seawater through the second side of the heat exchanger 100. When sufficient ice is formed in the heat exchanger 100, the flow of LNG is stopped and the flow of seawater is stopped and any residual seawater is drained from the second side of the heat exchanger 100. A hot combusted flue gas is then passed through the first side of the heat exchanger 100, providing heat to melt the ice, and fresh water from the melted ice is drained from the second side of the heat exchanger 100. After draining the fresh water, the process is repeated. It is contemplated that this process will use multiple heat exchangers 100, and the flow of LNG and flue gas will be passed through the heat exchangers 100 in a sequential manner to provide for continuous production of fresh water.

In an alternate embodiment, the process further comprises passing a second portion of the LNG stream to a combustor 110, passing a compressed air stream to the combustor 110 and combusting the natural gas to produce a hot combusted gas stream. The hot combusted gas stream is passed to a turbine expander 120 thereby generating power with a hot combusted flue gas stream leaving the turbine expander 120. The turbine expander 120 generates power, and is also used to operate a compressor 130. The compressor 130 compresses an air stream which is fed to the combustor 110.

A heat exchanger 140 is preferred to heat the second portion of the LNG stream, and is heated with the hot combusted flue gas stream from the turbine expander 120. The heat exchanger 140 is sized to vaporize the LNG stream, such that the combustor 110 receives a regasified natural gas stream. The hot combusted flue gas stream is subsequently directed to the heat exchangers 100 for melting the ice that was frozen during an earlier step in the process.

Operation of the compressor 130 is more efficient if the air to be compressed has been cooled first. The air is cooled by passing LNG through a heat exchanger 150 prior to passing the LNG to the heat exchangers 100 used for regasifying the natural gas. Air passed through the heat exchanger 150 is then passed to the compressor 130 for the production of compressed air.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A process for desalination of water comprising:
   continuously passing liquefied natural gas through a first side of a heat exchanger;
   passing salt water through a second side of the heat exchanger at a pressure that is at least atmospheric;
   forming an ice-brine mixture in the second side of the heat exchanger and forming a vaporized natural gas stream on the first side of the heat exchanger; and
   separating the ice from the ice-brine mixture, and drawing off a first stream comprising an ice enriched mixture and a second stream comprising a first brine stream.

2. The process of claim 1 further comprising:
   passing the first stream comprising ice to a wash column;
   passing water over the ice from the first stream forming a washed-ice stream and a second brine stream;
   drawing off the washed-ice from the wash column; and
   drawing off the second brine stream.

3. The process of claim 2 further comprising:
   passing the washed-ice to a melter having a first side for passing the washed-ice through and a second side for passing a salt water stream through;
   passing the salt water stream through the second side; and
   drawing off a water stream from the melted washed-ice.

4. The process of claim 3 wherein the salt water stream from the melter is passed to the second side of the heat exchanger.

5. The process of claim 1 further comprising passing the vaporized natural gas stream to a separation unit for separating natural gas liquids from the vaporized natural gas stream.

6. The process of claim 1 further comprising agitating the ice-brine mixture in the second side of the heat exchanger.

7. The process of claim 1 further comprising pressurizing the liquefied natural gas to a pressure greater than about 3 MPa (435 psia) thereby creating a pressurized liquid natural gas stream to pass through the first side of the heat exchanger.

8. The process of claim 7 wherein the liquefied natural gas is pressurized to a pressure greater than about 6.5 MPa (940 psia) thereby creating a pressurized liquid natural gas stream to pass through the first side of the heat exchanger.

9. An apparatus for desalinating salt water comprising:
   a first heat exchange unit having a first side with an inlet in fluid communication with liquefied natural gas and an outlet for passing natural gas that is at least partially vaporized, and a second side having an inlet in fluid communication with salt water, and operated at a pressure that is at least atmospheric and an outlet for passing an ice-brine mixture;
   a separation unit with an inlet in fluid communication with the first heat exchanger second side outlet, a first outlet for passing an ice stream and a second outlet for passing a brine stream;
   a wash unit with an inlet in fluid communication with the separation unit first outlet, and a first outlet for passing a washed ice stream and a second outlet for passing a rinsed brine stream; and
   a second heat exchange unit having a first side with an inlet in fluid communication with the wash unit first outlet, a first outlet for passing melted ice, a second inlet in fluid communication with a salt water source, and a second outlet for passing cooled salt water.

10. The apparatus of claim 9 wherein the first heat exchanger further comprises an agitator for stirring the ice-brine mixture in the second side of the first heat exchanger.

11. The apparatus of claim 9 further comprising a natural gas liquids separation unit having an inlet in fluid communication with the first heat exchange unit natural gas outlet, a first outlet for vaporized natural gas, and an outlet for natural gas liquids.

* * * * *